(12) United States Patent
Sorek et al.

(10) Patent No.: US 8,570,389 B2
(45) Date of Patent: Oct. 29, 2013

(54) ENHANCING DIGITAL PHOTOGRAPHY

(75) Inventors: Noam Sorek, Zichron Yaacov (IL); Ilya Vitsnudel, Even Yehuda (IL)

(73) Assignee: Broadcom Corporation, Irvine, CA (US)

( * ) Notice: Subject to any disclaimer, the term of this patent is extended or adjusted under 35 U.S.C. 154(b) by 1008 days.

(21) Appl. No.: 11/187,355

(22) Filed: Jul. 21, 2005

(65) Prior Publication Data

US 2006/0017837 A1    Jan. 26, 2006

Related U.S. Application Data

(60) Provisional application No. 60/589,792, filed on Jul. 22, 2004, provisional application No. 60/598,434, filed on Aug. 4, 2004, provisional application No. 60/644,008, filed on Jan. 18, 2005.

(51) Int. Cl.
*H04N 5/235* (2006.01)
*H04N 5/262* (2006.01)
*H04N 3/16* (2006.01)

(52) U.S. Cl.
USPC ......... 348/222.1; 348/284; 348/239; 348/362

(58) Field of Classification Search
USPC .................. 348/239, 284, 234, 362, 222.1
See application file for complete search history.

(56) References Cited

U.S. PATENT DOCUMENTS

| | | | | |
|---|---|---|---|---|
| 5,828,793 A * | 10/1998 | Mann | ............................. | 382/284 |
| 6,134,339 A | 10/2000 | Luo | | |
| 6,204,881 B1 * | 3/2001 | Ikeda et al. | .................... | 348/362 |
| 6,320,979 B1 * | 11/2001 | Melen | ............................ | 382/154 |
| 7,289,147 B2 * | 10/2007 | Webb | ............................. | 348/252 |
| 7,460,168 B2 * | 12/2008 | Horiuchi | ........................ | 348/362 |
| 2004/0080661 A1 * | 4/2004 | Afsenius et al. | .............. | 348/345 |
| 2004/0136603 A1 * | 7/2004 | Vitsnudel et al. | ............. | 382/254 |

\* cited by examiner

*Primary Examiner* — Joel Fosselman
(74) *Attorney, Agent, or Firm* — Brinks Hofer Gilson & Lione (57) ABSTRACT

A method for enhancing imaging in low light conditions. The method comprises acquiring two or more images, long images relating to long exposure times and a short images relating to short exposure times; processing the images to separate zones with high image details from zones of low image details; and reconstructing a final image where image information is selected from the short image in zones with high image details and from the long image in zones with low image details.

20 Claims, 10 Drawing Sheets

Option I: Mosaic DF Processing

Figure 5

Option II: YUV DF Processing

ENHANCING DIGITAL PHOTOGRAPHY

The present application claims the priority benefit of U.S. 60/589,792 filed Jul. 22, 2004, U.S. 60/598,434 filed Aug. 4, 2004 and U.S. 60/644,008 filed Jan. 18, 2005, all of which are incorporated by reference.

FIELD OF THE INVENTION

The present invention relates to digital photography. More particularly it relates to enhancing imaging.

BACKGROUND OF THE INVENTION

Modern photography has undergone significant paradigm shift by moving almost exclusively to the digital domain. Proliferation of Digital Still Cameras equipped with powerful image processing chips has opened new avenues for achieving excellent shots even in adverse shooting conditions. One of the common problems well known in traditional (film) photography is associated with taking an image in poor lighting conditions. In order to get enough light to produce a bright image the exposure time is increased thus causing blurring due to the trembling of the hand. In order to cope with this effect various solutions have been proposed in the past. Among those are: a mechanical stabilizer incorporated either into the lens or into the sensor. Advanced gyro mechanism for tracking camera movement is used for compensating hand trembling during long exposure shots.

It is an object of the present invention to provide novel approaches in digital photography to enhance digital imaging.

Other advantages and aspects of the present invention will become apparent after reading the present specification and considering the accompanying figures.

SUMMARY OF THE INVENTION

There is thus provided, in accordance with some preferred embodiments of the present invention a method for enhancing imaging in low light conditions, the method comprising:

acquiring a sequence of two or more images, at least a long image relating to long exposure time and a short image relating to short exposure time;

processing the sequence of two or more images to separate zones with high image details from zones of low image details; and reconstructing a final image where image information is selected from the short image in zones with high image details and from the long image in zones with low image details.

Furthermore, in accordance with some preferred embodiments of the present invention, the method comprises:

aligning the sequence of two or more images;

creating a combination mask that determines weights attributed locally to the long and short image information for reconstruction of the final image;

reconstructing the final image using the combination mask.

Furthermore, in accordance with some preferred embodiments of the present invention, the aligning comprises aligning the image levels of the sequence of two or more images and/or aligning geometrically the sequence of two or more images. And/or aligning the PSF of the images.

Furthermore, in accordance with some preferred embodiments of the present invention, the aligning is done based on identifying edges and aligning the images using partial edge information.

Furthermore, in accordance with some preferred embodiments of the present invention, the aligning is done using motion vectors extracted from an MPEG compression engine.

Furthermore, in accordance with some preferred embodiments of the present invention, the combination mask is created by finding edge zones and smoothing the edge zones.

Furthermore, in accordance with some preferred embodiments of the present invention, the combination mask further comprises information relating to smoothed local motion, and/or information on inconsistency between the images as from changing light sources, reflections, indication how much short or long image information ought to be added to zones of low image details, and information relating to misalignment between the images.

Furthermore, in accordance with some preferred embodiments of the present invention, the long image is simulated from the short image.

Furthermore, in accordance with some preferred embodiments of the present invention, the method further comprises: evaluating the images before processing to determine if any of them can be used solely as a final image, and if so providing that image as a final image.

Furthermore, in accordance with some preferred embodiments of the present invention, the images are acquired by taking a first image and sampling partial field information from the imaging sensor followed by taking the reset of the sequence of two or more images and sampling partial or full field information from the imaging sensor.

Furthermore, in accordance with some preferred embodiments of the present invention, the first image is the long image.

Furthermore, in accordance with some preferred embodiments of the present invention, the first image is the short image.

Furthermore, in accordance with some preferred embodiments of the present invention, processing of the images is carried out on raw image data.

Furthermore, in accordance with some preferred embodiments of the present invention, processing of the images is carried out on YUV image data.

Furthermore, in accordance with some preferred embodiments of the present invention, processing of the images is carried out in JPEG domain.

Furthermore, in accordance with some preferred embodiments of the present invention, color information for the final image is taken only from the long image.

Furthermore, in accordance with some preferred embodiments of the present invention, the final image is compressed in JPEG domain, and wherein the JPEG compression is adapted to comply with the processing of the images.

Furthermore, in accordance with some preferred embodiments of the present invention, during the acquisition of the images a strobe light is used with different or similar light energy for each image.

Furthermore, in accordance with some preferred embodiments of the present invention, the method further comprising applying red eye reduction.

Furthermore, in accordance with some preferred embodiments of the present invention, the red eye reduction comprises identifying red eye pixels by local analysis of the consistency of the images taken with different strobe durations, and utilizing the mask to deselect red eye areas from the images where they appear in.

Furthermore, in accordance with some preferred embodiments of the present invention, in the processing of the images a point spread function (PSF) is evaluated for each image.

Furthermore, in accordance with some preferred embodiments of the present invention, the PSF is evaluated using a gyro device.

Furthermore, in accordance with some preferred embodiments of the present invention, the PSF of each image is used for reconstructing each image, before the processing step of selecting regions from each image.

Furthermore, in accordance with some preferred embodiments of the present invention, the PSF of all the images together with all the image data is used for a simultaneously reconstruction of the result image.

Furthermore, in accordance with some preferred embodiments of the present invention, there is provided a camera comprising:

a lens;

imaging sensor on which the sensor may be focuses;

memory for storing image information;

controller for initiating acquiring of a set of two or more images, at least a long image relating to long exposure time and a short image relating to short exposure time;

processor for processing the sequence of two or more images to separate zones with high image details from zones of low image details; and reconstructing a final image where image information is selected from the short image in zones with high image details and from the long image in zones with low image details.

Furthermore, in accordance with some preferred embodiments of the present invention, the processor is adapted to perform: aligning the sequence of two or more images;

creating a combination mask that determines weights attributed locally to the long and short image information for reconstruction of the final image;

reconstructing the final image using the combination mask.

Furthermore, in accordance with some preferred embodiments of the present invention, the aligning comprises aligning the image levels of the sequence of two or more images and/or aligning geometrically the sequence of two or more images, and/or aligning the PSF of the images.

Furthermore, in accordance with some preferred embodiments of the present invention, the aligning is done based on identifying edges and aligning the images using partial edge information.

Furthermore, in accordance with some preferred embodiments of the present invention, the aligning is done using motion vectors extracted from an MPEG compression engine.

Furthermore, in accordance with some preferred embodiments of the present invention, the combination mask is created by finding edge zones and smoothing the edge zones.

Furthermore, in accordance with some preferred embodiments of the present invention, the combination mask further comprises information relating to smoothed local motion, and/or information on inconsistency between the images as from changing light sources, reflections, indication how much short or long image information ought to be added to zones of low image details, and information relating to misalignment between the images.

Furthermore, in accordance with some preferred embodiments of the present invention, the long image is simulated from the short image.

Furthermore, in accordance with some preferred embodiments of the present invention, the processor further performs:

evaluating the images before processing to determine if any of them can be used solely as a final image, and if so providing that image as a final image.

Furthermore, in accordance with some preferred embodiments of the present invention, the images are acquired by taking a first image and sampling partial field information from the imaging sensor followed by taking the reset of the sequence of two or more images and sampling partial or full field information from the imaging sensor.

Furthermore, in accordance with some preferred embodiments of the present invention, processing of the images is carried out on raw image data.

Furthermore, in accordance with some preferred embodiments of the present invention, processing of the images is carried out on YUV image data.

Furthermore, in accordance with some preferred embodiments of the present invention, processing of the images is carried out in JPEG domain.

Furthermore, in accordance with some preferred embodiments of the present invention, color information for the final image is taken only from the long image.

Furthermore, in accordance with some preferred embodiments of the present invention, the final image is compressed in JPEG domain, and wherein the JPEG compression is adapted to comply with the processing of the images.

Furthermore, in accordance with some preferred embodiments of the present invention, the camera further comprising a strobe light, wherein during the acquisition of the images a strobe light is used with different or similar light energy for each image.

Furthermore, in accordance with some preferred embodiments of the present invention, the processor further applies red eye reduction.

Furthermore, in accordance with some preferred embodiments of the present invention, the red eye reduction comprises identifying red eye pixels by local analysis of the consistency of the images taken with different strobe durations, and utilizing the mask to deselect red eye areas from the images where they appear in.

Furthermore, in accordance with some preferred embodiments of the present invention, in the processing of the images a point spread function (PSF) is evaluated for each image.

Furthermore, in accordance with some preferred embodiments of the present invention, the PSF is evaluated using a gyro device.

Furthermore, in accordance with some preferred embodiments of the present invention, the PSF of each image is used for reconstructing each image, before the processing step of selecting regions from each image.

Furthermore, in accordance with some preferred embodiments of the present invention, the PSF of all the images together with all the image data is used for a simultaneously reconstruction of the result image.

BRIEF DESCRIPTION OF THE DRAWINGS

In order to better understand the present invention, and appreciate its practical applications, the following Figures are provided and referenced hereafter. It should be noted that the Figures are given as examples only and in no way limit the scope of the invention. Like components are denoted by like reference numerals.

FIGS. 9 and 10 illustrate results of ratio and offset corrections.

DETAILED DESCRIPTION OF PREFERRED EMBODIMENTS

The present invention suggests a new method when addressing the hand-shaking problem. This method requires no mechanical parts and is based completely on image processing, involving two aspects: one aspect is a specific sensor operation and the other aspect is an advanced image-processing algorithm. The underlying physical principle of the proposed method is a utilization of the fact that human visual system is less sensitive to noise in the image in very "busy" regions with high frequency content, i.e. edges and small details. Considering the above, the method utilizes a dual exposure approach in which one exposure is made with longer integration time providing a blurred, but less noisy image while the second short exposure provides another version of the same image with much more noticeable noise but with significantly smaller amount of blur. (Actually, only one short exposure might be used, where the other—long exposure—might be simulated (evaluated) from the short exposure by applying a smoothing filter to suppress the noise, on the whole implementing a kind of an adaptive filter). On the next stage the two exposures are combined together to produce a single image through a combination mask that selectively picks regions from both exposures, according to the high frequency content of the smoothed version of the image.

The proposed algorithm for hand-trembling reduction is referred to, in the context of the present invention, as Digital Flash (DF).

A special implementation of the proposed method in the DCT domain (characteristic to JPEG and MPEG) enables very fast implementation of the method even on general purpose CPU, requiring small amounts of memory.

Figure 1:
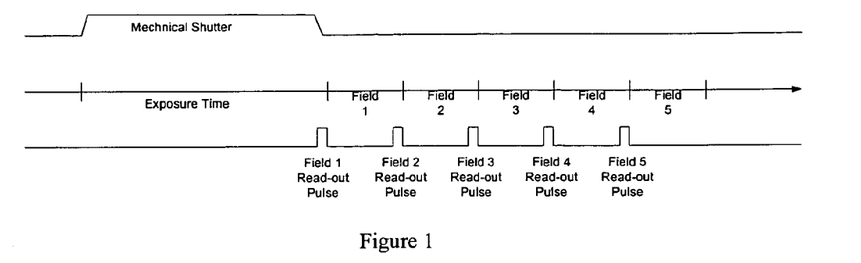
FIG. 1 illustrates the sampling scheme of a typical imaging sensor with 5 sequential fields (PRIOR ART).

Normally, large sensors used in a DSC have smaller number of vertical shift registers than the total number of available lines; therefore they are sampled during a number of sequential fields to enable efficient image read-out. FIG. 1 illustrates the sampling scheme of a typical imaging sensor with 5 sequential fields (PRIOR ART). Standard timing is shown in which a mechanical shutter determines the exposure time and 5 fields are read-out sequentially to obtain the image.

According to a preferred embodiment of the present invention, it is suggested to produce two sequential images with so-called "long" and "short" exposures. However, since the sensor is large, the second image might be acquired with certain delay from the first image, causing significant problems if the hand is trembling or if there is a motion present in the image scene. Some motion detection mechanism such as these available in MPEG coding might be used for image alignment and motion compensation, however in case of significant blur and considering the complexity and various limitations of the motion detection the output result is not always satisfactory. More on motion compensation is described below. Therefore, there is a strong need to produce "long" and "short" images as close in time as possible. One possible solution for this is to produce two adjoining images by changing the operation of the sensor in such a way that two exposures will be merged either into a single frame or into two adjunct images. During the frame some fields will be utilized to acquire the long exposure, while other fields will hold the image information of short exposure. The "Long" fields will provide necessary low-resolution information about the image background while the rest of the fields will provide highly detailed image with vital resolution.

Figure 2:
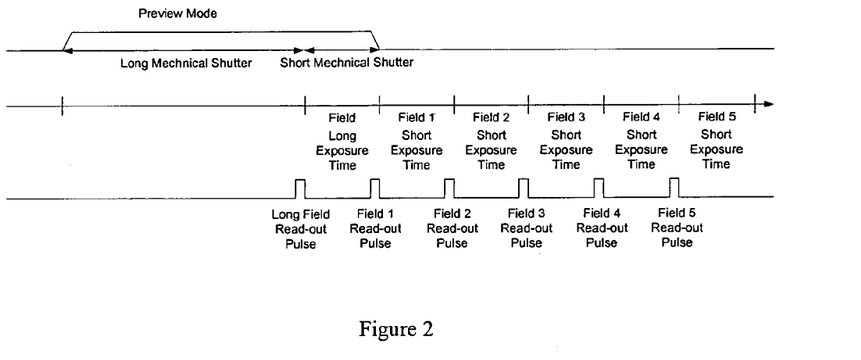
FIG. 2 illustrates a sampling scheme implemented on an imaging sensor in accordance with a preferred embodiment of the present invention.

FIG. 2 illustrates a sampling scheme implemented on an imaging sensor in accordance with a preferred embodiment of the present invention. A "long" exposure is followed immediately by a "short" exposure achieved by reading-out the information of only one or more "long" fields. Here we outlined one of many possible alternatives for making a "long-short" combination of fields. More options are described later in this application. The advantage of the sampling method of the present invention is that it produces a single "image" with combined "long-short" fields that does not require significant increase in storage space, but has all the necessary information relating to high resolution details ("short" image) and low resolution patches ("long" image).

Figure 3:
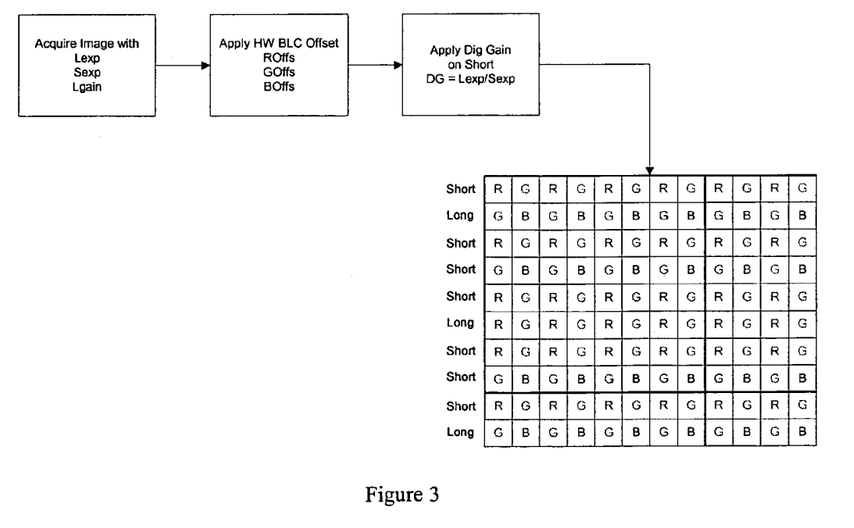
FIG. 3 is a schematic illustration of a buffer containing image information acquired using the sampling scheme illustrated in FIG. 2 with four "Short" fields and one "Long" field.

FIG. 3 is a schematic illustration of a buffer containing image information acquired using the sampling scheme illustrated in FIG. 2. In this example a buffer with one "Long" field and 3 "Short" fields is presented. The information for the Long missing fields is recovered from the available field, utilizing the fact that the Long image information is blurry and the "Short" missing field is recovered from the available read-out "short" fields.

Figure 4:
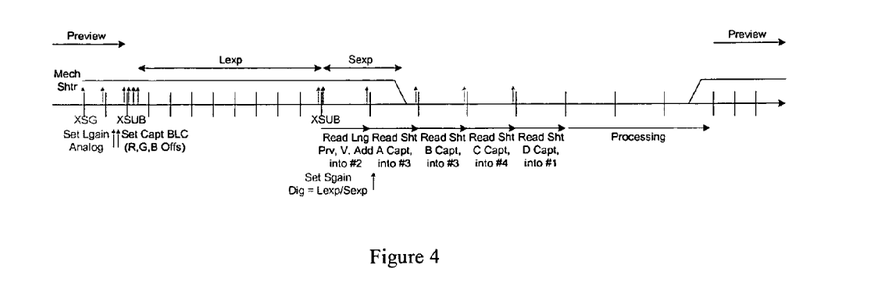
FIG. 4 illustrate the imaging sensor (CCD) detailed timing scheme that was used for the sampling scheme shown in FIG. 2.

FIG. 4 illustrate the detailed timing scheme of the imaging sensor (CCD) that was used for the sampling scheme shown in FIG. 2. Pulses that are used for the CCD operation are shown in the figure. XSG pulses represent sensor read-out, while XSUB pulses represent shutter control.

Once the image information is there, an algorithm is proposed for processing it, according to some preferred embodiments of the present invention. There are several options to apply the Digital Flash (DF) algorithm for trembling reduction.

Figure 5:
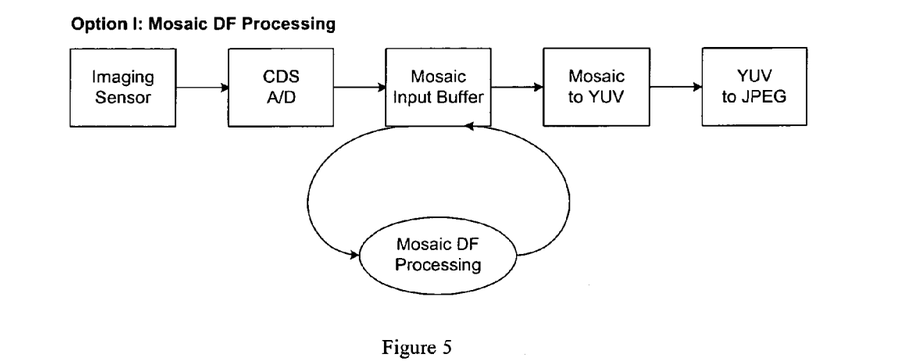
FIG. 5 illustrates digital flash (DF) processing according to a preferred embodiment of the present invention carried out on mosaic image data.

One option is to Mosaic DF Processing. FIG. 5 illustrates digital flash (DF) processing according to a preferred embodiment of the present invention carried out on mosaic image data. In this option the DF processing is performed directly on raw mosaic data from the sensor which is stored in the Mosaic Input Buffer. The intertwined "long-short" fields from the input buffer are combined together at the stage when the raw mosaic data becomes available from the sensor. At this stage the main process calls a DF algorithm. This option is better exploited when system resources such as memory and CPU power are limited. The method requires only a single image buffer and operates on a single mosaic plane as opposed to the three planes used in YUV processing. After being processed by the DF algorithm standard processing is applied on the output. Depending on image quality considerations the parameters (such as, White Balance, Edge Enhancement, JPEG Compression (changing QT tables) and more) might be adjusted for better overall performance and speed optimization.

Figure 6:
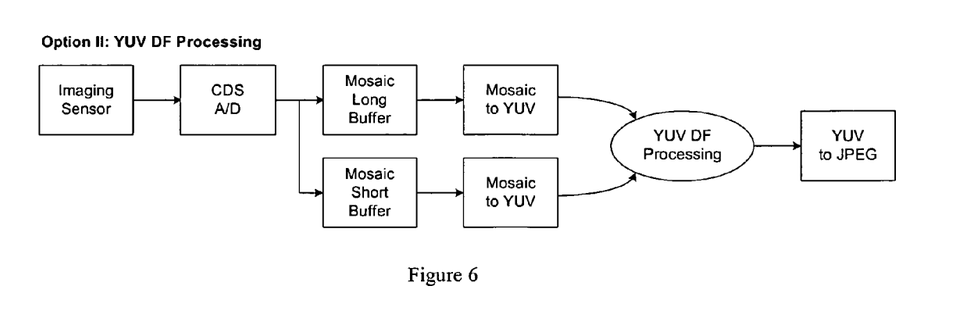
FIG. 6 illustrates DF processing according to another preferred embodiment of the present invention, carried out on YUV image data.

Another option is YUV DF Processing. FIG. 6 illustrates DF processing according to another preferred embodiment of the present invention, carried out on YUV image data. In this option the image reconstruction is done separately on "long" and "short" channels stored in two mosaic buffers and then the DF processing is performed on a pair of "long-short" YUV images. At this stage the DF algorithm assumes that both mosaic images have been processed and converted into YUV format. The processing is done separately on the three planes through a common mask and the result is produced as a single output YUV image for subsequent JPEG compression. Depending on the noise levels of the imaging system sometimes it is preferable to use only the colors (U/V planes) of the "long" exposure in the output image. It helps to decrease the color noise while not diminishing the overall image quality. Because of the need to process three planes the processing time is increased and also there is a need to hold two images in the memory. Handling two separate memory buffers causes major degradation in the memory cache performance, which rather slows the processing.

Figure 7:
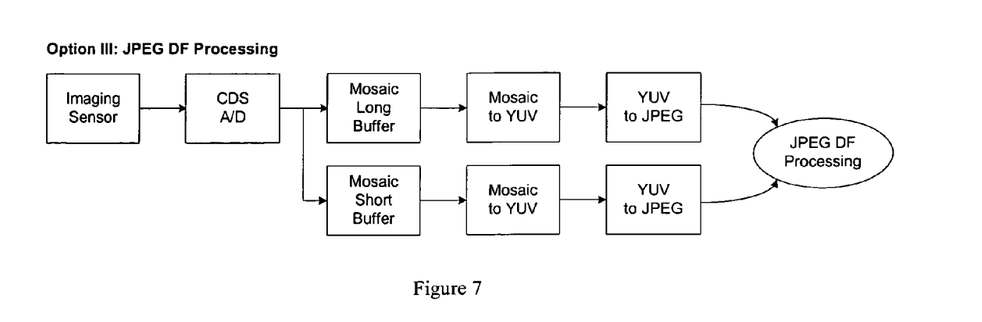
FIG. 7 illustrates DF processing according to another preferred embodiment of the present invention, carried out on JPEG image data.

Yet another option is JPEG DF Processing. FIG. 7 illustrates DF processing according to another preferred embodiment of the present invention, carried out on JPEG image data. Here the reconstruction of two images is performed first, then the images are converted into the JPEG format and the DF processing is made in the JPEG domain. This option enables very fast DF processing since it might be performed in the JPEG compressed domain. An example of such processing is described in U.S. patent Ser. No. 10/622,335 ("Enhanced Wide Dynamic Range Imaging"), incorporated herein by reference. In this approach the two JPEG streams (of "long" and "short" images) are subjected only to Huffman decoding and combining of the streams is performed then on the Quantized DCT coefficients which are mostly zero. After the processing the resultant coefficients are Huffman encoded into the output stream. Therefore the processing is performed at ultra-fast speed with minimal memory requirements. Weighting operations needed for combining "long" and "short" images through the mask become the convolutional operators, however they are implemented fastly by the similar approach described in U.S. patent Ser. No. 10/622,335 ("Enhanced Wide Dynamic Range Imaging").

Figure 8:
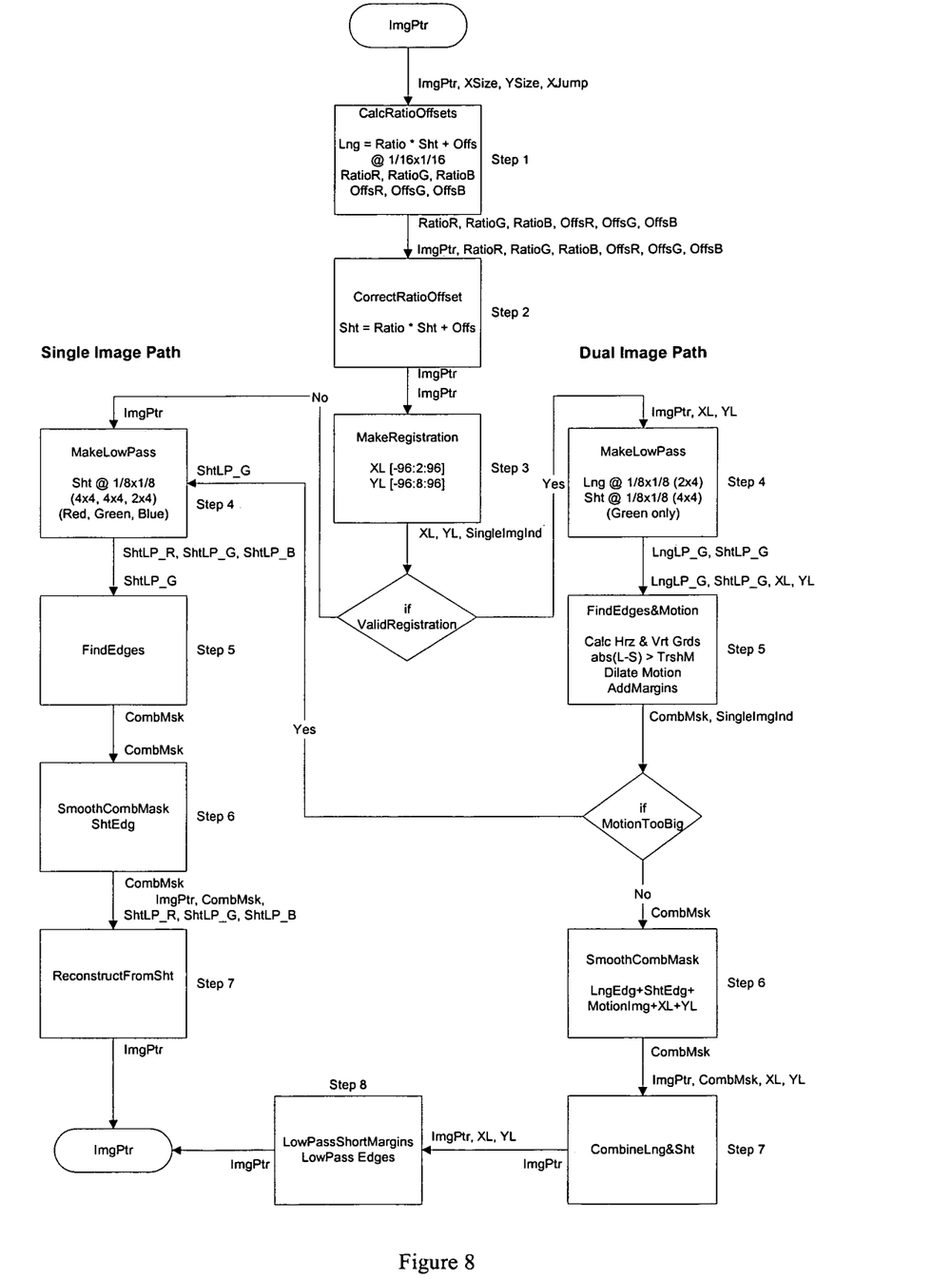
FIG. 8 illustrates a DF algorithm, according to a preferred embodiment of the present invention.

The Digital Flash image-processing algorithm is outlined next in the following FIG. 8. The first step (step 1) involves aligning the "long" and "short" images from their gray level perspective. The Offset and the Ratio between the images are estimated by using decimated version of the "long" and "short" images based on the following formula:

$$ImgLng = Ratio * ImgSht + Offset$$

Simple Least Square Procedure is preferably used to estimate the Ratio and Offset parameters. Sometimes only Offset calculation is sufficient to align the images and when the system is calibrated well there is no need to perform image alignment at all. When the sensor is not calibrated and operated properly there is a need also to estimate and change the Offset from line-to-line by a process that is known as Black-level estimation and clamping.

The next step (step 2) is based on the previous estimation of Ratio and Offset. "Short" image or its respected fields are corrected to have a proper level alignment with the "Long" image by using the following formula:

$$ImgSht' = Ratio * ImgSht + Offset$$

Figure 9:
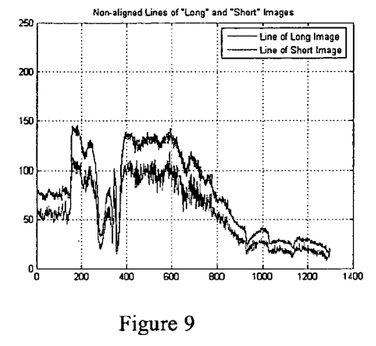
FIG. 9 illustrates non-aligned lines of "Long" and "Short" images.
Figure 10:
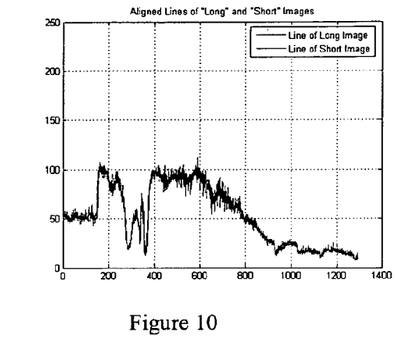
FIG. 10 illustrates aligned lines of "Long" and "Short" images.

FIGS. 9 and 10 illustrate results of ratio and offset corrections, FIG. 9 illustrates non-aligned lines of "Long" and "Short" images, and FIG. 10 illustrates aligned lines of "Long" and "Short" images.

The next step of the algorithm (step 3) is then carried out. Since the "Long" and "Short" images are taken within a certain time delay there is a potentially global motion that might be present between the images. At this stage a geometrical registration between images is made in order to align in the best possible manner for the subsequent processing. The global motion search is preferably separated into vertical and horizontal directions and minimum cross-correlation (actually finding the minimum of sliding absolute difference) is estimated in each direction. To enable fast implementation, a cross-correlation is performed along three separate lines and a decision is made based on sort of a majority vote between the results. In case that the DF algorithm is performed along the MPEG compression, the motion vectors from the MPEG engine might be utilized for better assessment of the registration. An example of using filtered MPEG motion vectors for global motion estimation is given in Provisional Patent Application 60/654,944 "MPEG Based Video Image Stabilization".

If the results of motion registration process indicate that the motion was too big then the combination of "Long" and "Short" images is aborted and the process is continued on the single "short" image using the regular image reconstruction procedure.

The next step (step 4) involves evaluating small low-pass versions of the "Long" and "Short" images in order to enable fast and robust estimations of the edges for a succeeding combination mask. Since the DF algorithm is usually performed on image data relating to low-light illumination scenarios the input images are rather noisy, therefore the low-pass filter serves as a smoothing device to suppress the noise. Usually, filtering is performed on an 8×8 block and then the block is reduced to a single pixel in the final version of the low-pass image.

In the JPEG domain the DC coefficients of the DCT transform are readily available and comprise a low-pass version of the "Long" and "Short" images.

Next (step 5) a combination mask is used. Four parts comprise the combination mask:

Edge images: Actually gradient images are evaluated on the low-pass versions of the "long" and "short" images of the previous step (step 4). Then a threshold operator is applied and the binary mask (with levels of "255" and "0") is obtained indicating the regions of the image where a high activity is taking place. This mask is used to pick the portion of the "Short" image where high resolution is available.

Motion indication is obtained by comparing the low-pass versions of "Long" and "Short" images. The discrepancy between level and global motion aligned images provides a clue to the local motion present in the image. In these regions the final result is provided based on the information only from the "Short" image, therefore the binary mask has the value of "255".

In the regions where the information ought to have come from the "Long" image, i.e. the regions with little image activity, it is sometimes necessary to add some small, predefined percentage of the "Short" image. Therefore, a value is added to the combination mask depending on the image level at this location. The amount of the required "Short" image is determined empirically and may vary according to imaging conditions and other considerations. For example, depending on the noise characteristics, the amount of "Short" image may be bigger for brighter image areas and smaller for darker image areas, since noise addition is more noticeable in the dark region.

Another part of the combination mask is coming from the registration considerations. In case that there is a global motion between "long-short" pair the "long" image is geometrically aligned to the "short", leading to the fact that some image margins are covered only by "short" image. In order to be able to use only the "short" image at those margins, "255" level indicating only "short" signal is added to the mask. In this way a simple treatment of the global motion is achieved.

Figure 11:
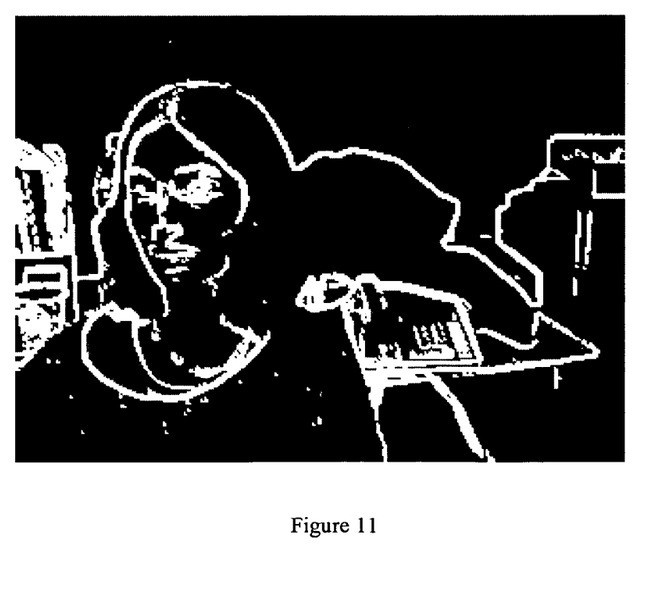
FIG. 11 illustrates a combination mask of a pair of images, according to a preferred embodiment of the present invention.

FIG. 11 illustrates application of a combination mask on an image, according to a preferred embodiment of the present invention. In this figure, the white portions indicate regions where the image should come from only the "Short" channel, while other colors indicate a relative weight of the "Short" and "Long" combination. It might be seen that in more bright regions the percentage of the "Short" is greater.

At this stage the amount of motion between "Long" and "Short" images is checked again and if strong motion exists then a multiple image-processing path is aborted and single image-processing path is initiated.

The next step (step 6) is now reached. To get a visually pleasing result the "Long" and "Short" images should preferably be combined very smoothly, with gradual mixture of their respective levels. Toward this end filtering of the combination mask is performed at this stage. Simple IIR filter with a predefined pole is applied on the combination mask image running in four directions: left-to-right, right-to-left, top-to-bottom and bottom-to-top. Actually the low-pass filter is slightly adapted not to decrease the amount of the "Short" image used for the combined image. The value of the next pixel in the low-pass image is checked and is adjusted only if it is found to be larger than the value of the previous pixel. In this way only increment of the low-pass content is achieved in the combination mask.

Figure 12:
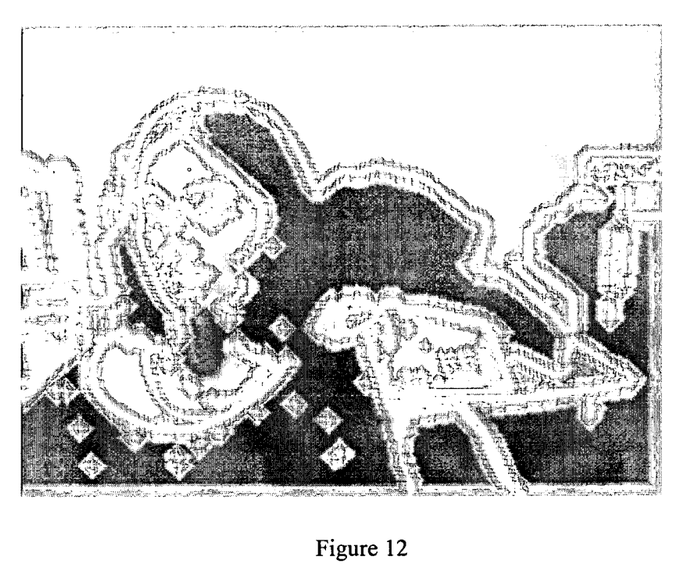
FIG. 12 shows a resulting image obtained when applying low-pass filter on the combination mask (see FIG. 11).

FIG. 12 shows the result of applying the low-pass filtering to the combination mask. Simple filter structure enables very fast and efficient implementation of the low-pass filter without introducing any noticeable artifacts in to the final result.

Step 7: At this stage the actual combination of the "Long" and "Short" images is performed. "Long" and "short" images are composed into a final result through the combination mask by a proper weighting of their content, using the following relation:

$$ResImg=W*ShtImg+(255-W)*LngImg$$

Depending on the acquisition method for the "long" and "short" channels prior to their combining, it might be necessary to perform some kind of interpolation to recover missing pixel elements of the "Long" and/or "Short" image. The kind of interpolation strongly depends on the available system resources, in the simplest case the interpolation being a zero-order hold or other bilinear interpolation.

Moreover, since the combination mask has been estimated using a smaller grid of pixels it is also necessary to perform a further bilinear interpolation of the combination mask to cover the whole image domain. Such a bilinear transformation might be performed very efficiently, basically requiring only a single evaluation per pixel as was described in |U.S. patent application Ser. No. 10/622,335 "Enhanced Wide Dynamic Range Processing".|

Figure 13:
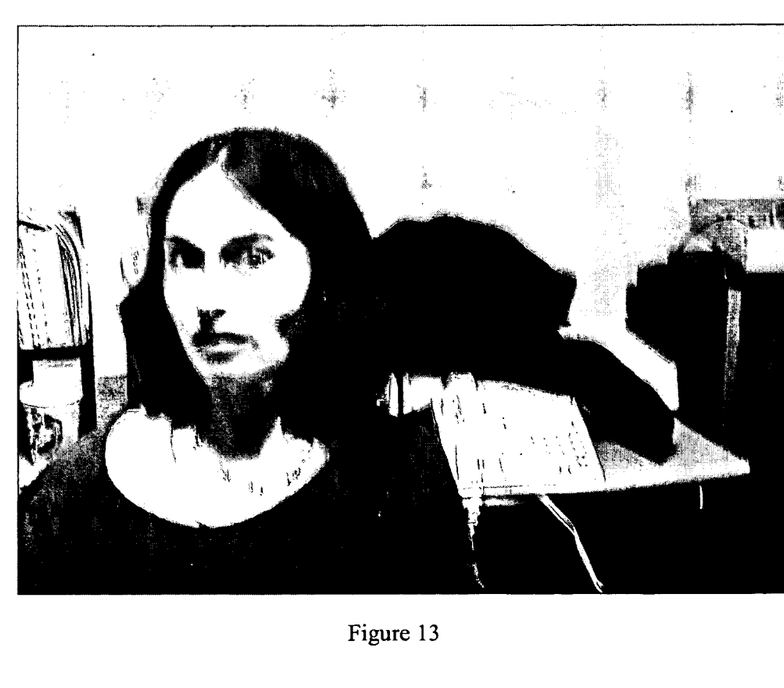
FIG. 13 illustrates a "Long" image, with blur caused by hand-trembling during the acquisition of the image.
Figure 14:
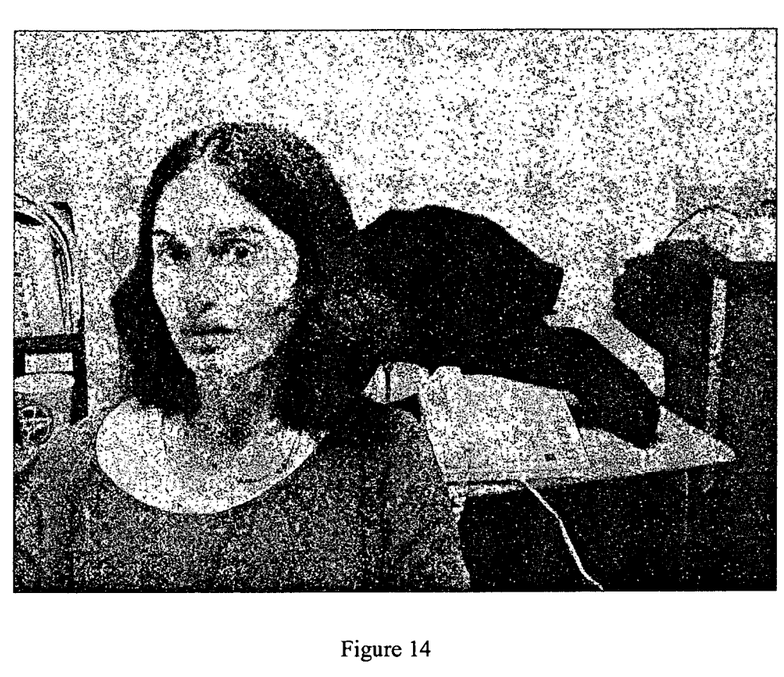
FIG. 14 illustrates a "Short" image, with characteristic noise caused by applying gain factor to increase visibility of the underexposed image.

At the last stage (step 8) some low-pass of the image margins is made to provide a smooth blending of image margins into a whole image. FIG. 13 illustrates a "Long" image, with blur caused by hand-trembling during the acquisition of the image. FIG. 14 illustrates a "Short" image, with characteristic noise caused by applying gain factor to increase visibility of the underexposed image. Notice the slight color change due to incorrect exposure.

Figure 15:
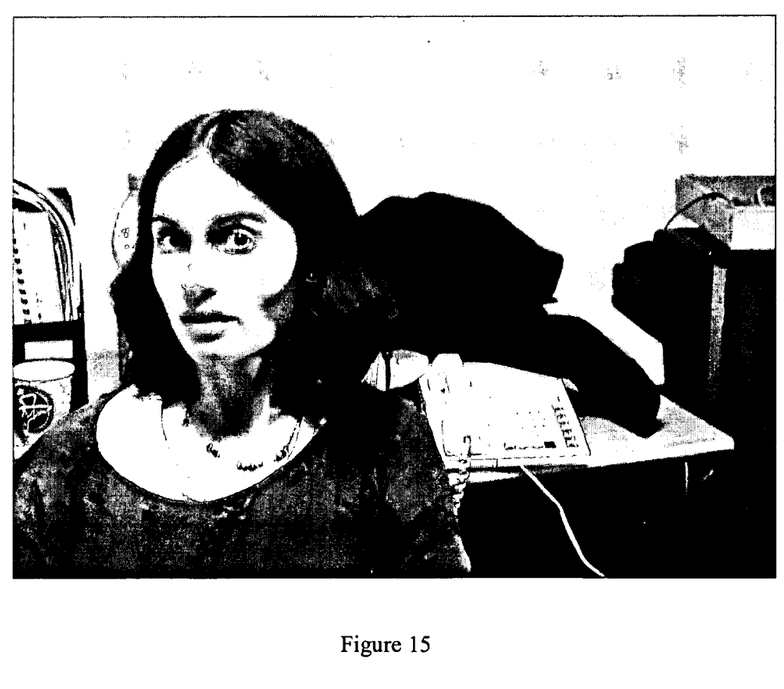
FIG. 15 illustrates a resultant image obtained using DF technique, according to a preferred embodiment of the present invention.

FIG. 15 illustrates a result image obtained using DF technique, according to a preferred embodiment of the present invention. Note that the image is not blurry as with overexposed image neither has it the noise level characteristic of underexposed image.

A method for stabilizing images which does not require any moving parts, and an apparatus for the same are now presented. This aspect of the present invention too relates to taking pictures in an environment were either the camera is moving or shaking, resulting in a blurred image, with details in the result image being lost.

This aspect of the present invention aims at compensating for the movements during the image taking by digital processing means, without actually moving the sensor or the optics.

A method according to a preferred embodiment of the present invention, comprises a sensor, which can be exposed to light during exposure time to capture images, optics that projects the light from the subject being imaged, a detector that detect the motion of the camera relative to the main subject during the exposure time of each image and a processor to process the outputs of the motion detector to produce an estimated Point Spread Function (PSF), and to process the images captured by the sensor, based inter-alia on the estimated PSF, to produced a non blurred image.

The detector can be either a motion detector that detects the actual motion of the camera, or an optical detector that detects the relative motion of the subject to the camera, as know in prior art.

An innovation involved here is that the output of the motion sensor is processed by the processor to estimate the blur-function, the PSF that the motion caused.

After the images are captured, the estimated PSF is used by the processor in order to perform image restoration or image deblurring. In one embodiment of the innovation, the images are restored one by one, and then the later steps of applying combination masks are applied as described before. In another embodiment of the innovation, the reconstruction, or deblurring, is performed on the whole set of images and matching PSFs simultaneously to reconstruct one resultant image.

Both motion sensor and image restoration based on PSF are well known in prior art.

The innovation here is using the output of motion sensor in a camera for the estimation of the exact PSF caused by the motion during exposure time, and the compensation of motion blurred images in a camera or at a later stage in a remote processing unit by using estimated PSF. Further innovation is the use of sequence of images having different exposure times and different PSF to reconstruct one image.

This innovation can be used also in conjunction with other image stabilization systems, as a mechanical image stabilization to refine the results of the mechanical stabilization, and/or to add motion axis to the mechanical correction axis, like rotation axis to a mechanical X, Y correction unit. The following section describes the use of one embodiment of the innovation, with example of simulated results that demonstrate one optional use of the innovation.

Figure 16:
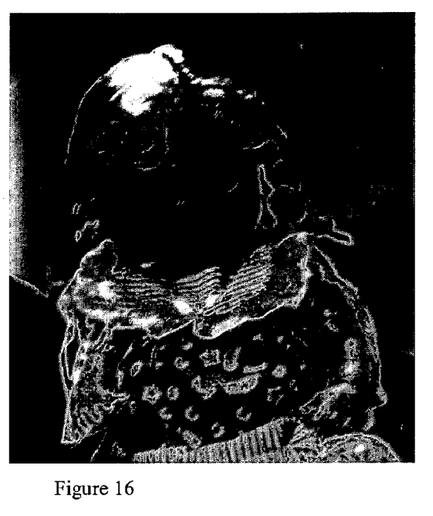
FIG. 16 illustrates an image obtained using a hand-held digital camera, with blur caused by hand or body movement.

FIG. 16 illustrates an image obtained using a hand-held digital camera, with blur caused by hand or body movement.

Figure 17:
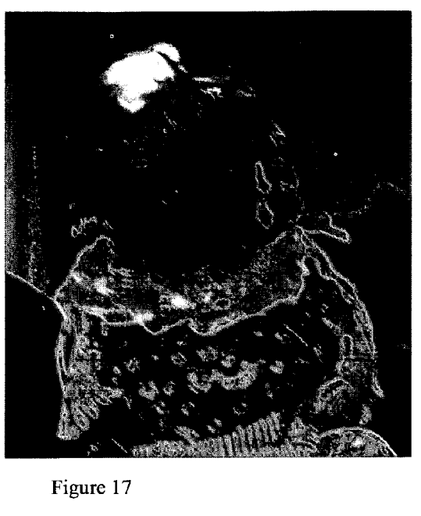
FIG. 17 illustrates an enlarged section of the image of FIG. 16 obtained by calculation from the movement sensor using a Point Spread Function (PSF).

FIG. 17 illustrates an enlarged section of the image of FIG. 16 obtained by calculation from the movement sensor using a Point Spread Function (PSF). In this example the PSF is uniform all over the image, but in other embodiments of the innovation, the PSF can vary from pixel to pixel.

Figure 18:
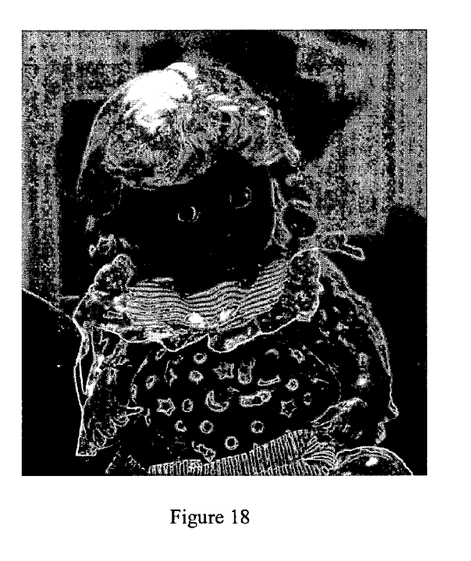
FIG. 18 illustrates a restored image calculated from the image of FIG. 16 using the PSF of the image shown in FIG. 17.

FIG. 18 illustrates a restored image calculated from the image of FIG. 16 using the PSF of the image shown in FIG. 17.

We turn now to a third aspect of the present invention.

Digital still cameras (DSC) are produced with ever increasing sensor resolution. To handle such a big format, the sensor information is read through a number of sequential fields spanning a significant amount of time. Therefore, if multiple exposures are required for various kind of image processing they cannot be produced sufficiently close in time, meaning that there might be a misalignment between the images because of possible object or camera movement between takes. It is proposed to modify the image acquisition together with the sensor sampling sequence to achieve close in time multiple exposure imaging. Normally, since big sensors used in the DSC have smaller number of vertical shift registers than the total number of lines available, they are sampled during a number of sequential fields to enable efficient image read-out (see FIG. 1).

Different information from subsequent frames, such as various exposures, resolutions or focuses, to name a few, might be sometimes successfully used to construct a single superior image. However, a time gap exists between the subsequent image frames taken by the camera. Therefore if there is motion present in the scene or the camera is moved during the taking, there will be a discrepancy between the images. In order to overcome this setback it is proposed to change the operation of the sensor in such a way that two various exposures will be merged either into a single frame or two adjacent images. During the frame some fields will be utilized to acquire the long exposure, while the others will hold the image with short exposure. The long fields will provide necessary low-resolution information about the image background while the rest of the fields will provide highly detailed image with vital resolution.

Figure 19:
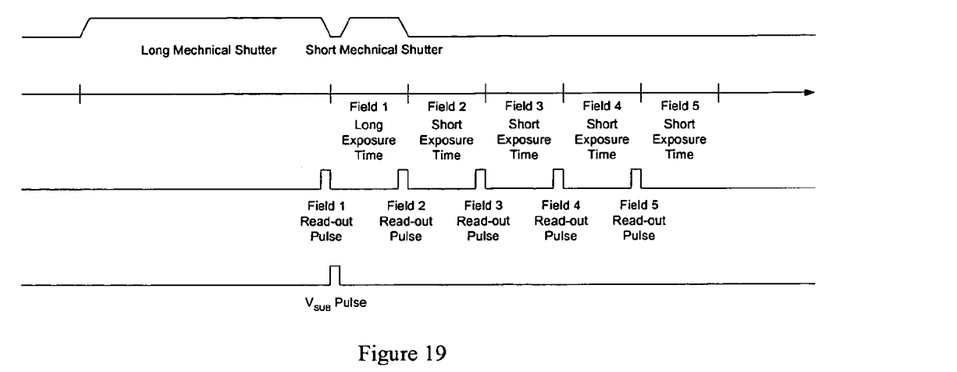
FIG. 19 illustrates a sampling scheme for high-resolution imaging sensor for sequential multiple exposures, according to a preferred embodiment of the present invention.

FIG. 19 illustrates a sampling scheme for high-resolution imaging sensor for sequential multiple exposures, according to a preferred embodiment of the present invention. The "long" exposure is followed immediately by the "short" exposure achieved by reading-out the information of only one or more "long" fields.

The advantage of this scheme is that the operation of the timing generator should not be changed. The image comprising of long and short fields is captured within the regular timing sequence. The only modification required is an addition of $V_{SUB}$ pulse to discharge the CCD (image sensor) before continuing the acquisition of the short exposure.

Figure 20:
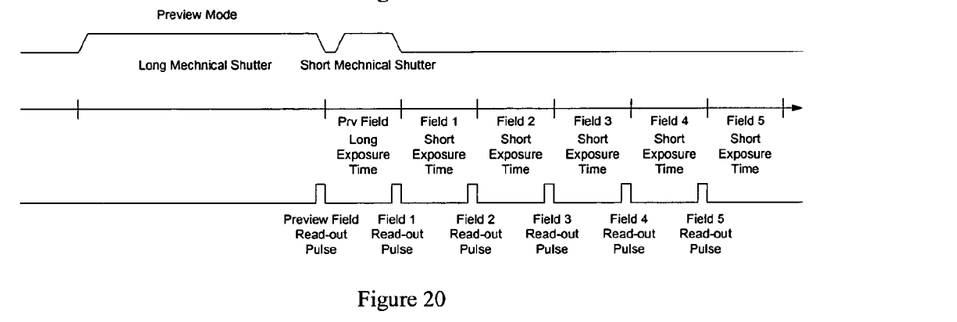
FIG. 20 illustrates an alternative sampling scheme for high-resolution imaging sensor for sequential multiple exposures, according to a preferred embodiment of the present invention.

FIG. 20 illustrates an alternative sampling scheme for high-resolution imaging sensor for sequential multiple exposures, according to a preferred embodiment of the present invention. This scheme does not require any additional hardware changes, however two images (Preview and Short) will be stored in the memory, requiring wider bandwidth of the image data during the subsequent processing.

Figure 21:
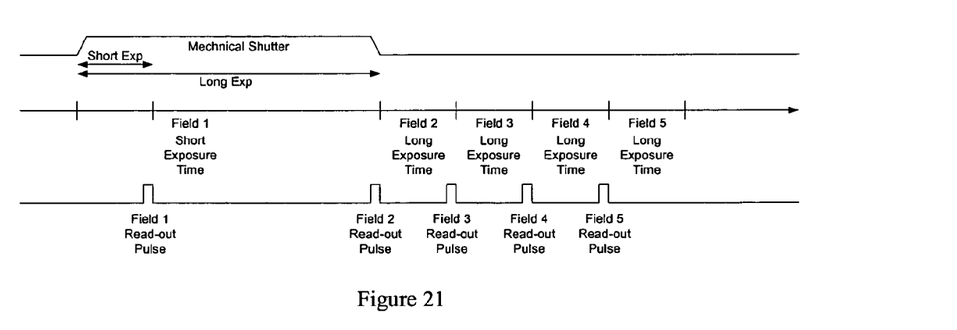
FIG. 21 illustrates another alternative sampling scheme for high-resolution imaging sensor for sequential multiple exposures, according to a preferred embodiment of the present invention.

|FIG. 21 illustrates another alternative sampling scheme for high-resolution imaging sensor for sequential multiple exposures, according to a preferred embodiment of the present invention.|

In this scheme the field representing the short signal is read-out first. Then following an additional time period of long exposure remaining fields are read to get a combined short-long image.

Figure 22:
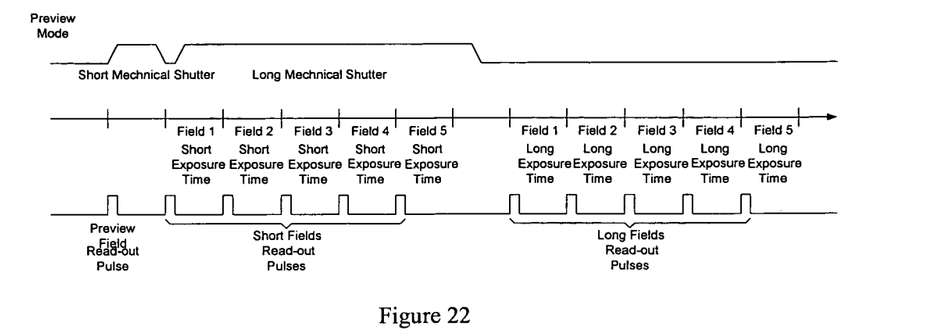
FIG. 22 illustrates a dual exposure sampling technique in which two full images are acquired, one with short exposure and one with long exposure.

FIG. 22 illustrates a straightforward sampling scheme for obtaining two full images with different exposures. Here the full short image is acquired first followed by the acquisition of the full long image. The advantage of this scheme is that it can produce the final image with better resolution in the background areas, however it more prone to the motion artifacts since the short and long exposures that are obtained using this method are separated in time because of the time required for the read-out of the first image.

Figure 23:
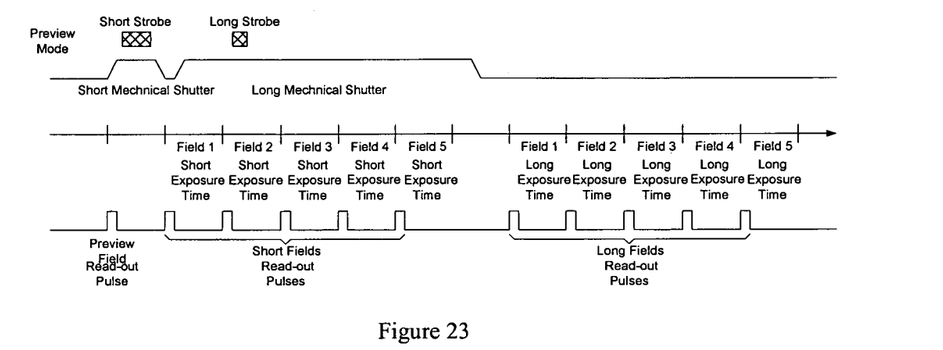
FIG. 23 illustrates a dual exposure technique using strobe light on both exposures to produce a couple of images that might be used for red eye phenomenon reduction.

Another aspect of the invention relates to using dual image schemes where strobe lights might also be used to get additional benefits for image quality. FIG. 23 demonstrates a sampling schematic in which, strobe lights of different durations are fired during both or either one of the exposures. The strobe light is very effective for illuminating close objects while it can not cope successfully with distant objects. Using strobe during the short image provides a detailed image of the foreground (usually a person image standing in front of the camera), while the details from the long provide the background. In U.S. Pat. No. 6,134,339 it was suggested that using one image with strobe light and the other without might be used for eliminating red eye phenomenon characteristic. However, using flash light of various durations during both short and long exposures, together with the use of different exposure times for these images, provides the innovation that enables more accurate and robust removal of red eye effect. Further, in the preferred embodiment of the current innovation, the mask for selecting pixels from one of the images, is used to deselect the red eye pixels from the image.

Figure 24:
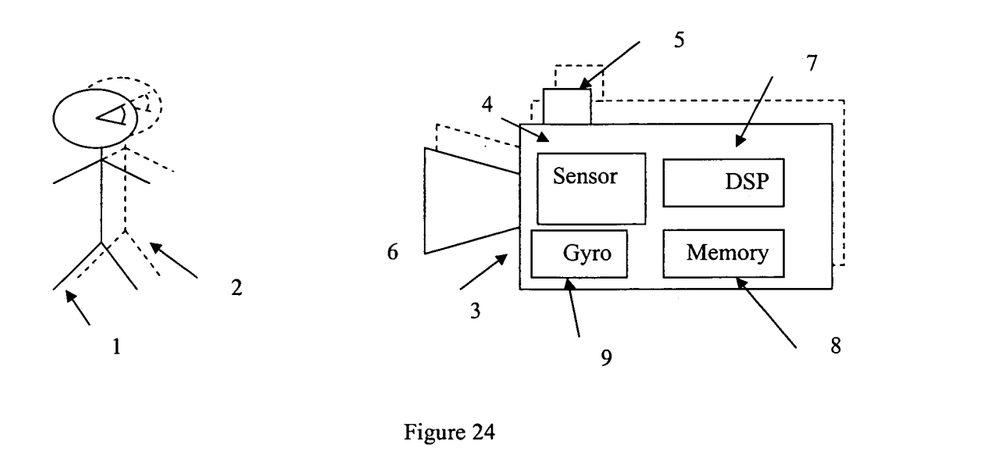
FIG. 24 illustrates a camera implementing a method for enhancing imaging.

FIG. 24 illustrates a camera implementing the method of the present invention. In this figure an object (1) is shown that might move during the process image taking (2) and a camera (3) that also might be moved due to hand trembling of the photographer or other motion effects. In the camera there is a strobe light (5) and components such as lens (6) that can be focused on an imaging sensor (4), memory for storing acquired images (7), DSP processor (8) for image processing and an optional Gyro (9) mechanism for motion assessment.

It should be clear that the description of the embodiments and attached Figures set forth in this specification serves only for a better understanding of the invention, without limiting its scope.

It should also be clear that a person skilled in the art, after reading the present specification could make adjustments or amendments to the attached Figures and above described embodiments that would still be covered by the present invention.

The invention claimed is:

1. A method for enhancing imaging in low light conditions, the method comprising:
  acquiring a sequence of two or more images comprising at least a long image relating to long exposure time and a short image relating to short exposure time;
  processing the sequence of two or more images by:
    identifying at least one image zone of the sequence of two or more images having corresponding image levels between the long image and the short image upon gray level alignment;
    filtering the short image and the long image to identify image edges in the short image and the long image generating a filtered short image and a filtered long image;
    based on the identified image edges, masking the filtered short image and the filtered long image to identify high activity regions of the short image and the long image;
    based on the masking, identifying high resolution areas of the filtered short image and generating an image combination mask; and
    reconstructing a final image by combining the long image and the short image with the image combination mask.

2. The method according to claim 1, wherein the gray level alignment comprises estimating an offset and a ratio between the long image and the short image to align the sequence of two or more images.

3. The method according to claim 2, further comprising using the estimated offset and ratio to correct the short image to have proper gray level alignment with the long image.

4. The method according to claim 1, further comprising:
  performing a geometrical registration process to align the short image and the long image; and
  when the geometrical registration process indicates excessive motion common to the sequence of two or more images, discarding the long image and producing the final image from the filtered short image.

5. The method according to claim 4, wherein, when the geometrical registration process indicates a presence of global motion between the filtered short image and the filtered long image, masking comprises discarding the long image and producing the final image from the filtered short image at selected image margins of the short image.

6. The method according to claim 4, wherein performing the geometrical registration process comprises estimating a cross-correlation between the filtered short image and the filtered long image in a vertical direction and a horizontal direction.

7. The method according to claim 6, wherein the cross-correlation is performed along a plurality of lines among the filtered short image and the filtered long image.

8. The method according to claim 1, further comprising applying a smoothing filter to the image combination mask.

9. The method according to claim 8, wherein the smoothing filter is an infinite impulse response (IIR) filter.

10. The method according to claim 9, wherein the smoothing filter has a predefined pole.

11. An image processing device comprising:
  a sensor;
  a memory;
  a processor in communication with the memory and the sensor, the processor being operable to:
    acquire a sequence of two or more images comprising a plurality of image zones from the sensor, the sequence of two or more images comprising at least a long image relating to a long exposure time and a short image relating to a short exposure time;
    identify at least one image zone of the sequence of two or more images having corresponding image levels between the long image and the short image upon gray level alignment;
    filter the short image and the long image to identify image edges in the short image and the long image generating a filtered short image and a filtered long image;
    based on the identified image edges, mask the filtered short image and the filtered long image to identify frequency content above a predetermined threshold;
    based on the masking, identify high resolution areas of the filtered short image and generate an image combination mask;
    compare the filtered short image and the filtered long image to identify regions of local motion; and
    reconstruct a final image with the image combination mask, wherein image information is selected from the short image in said at least one identified image zones with frequency content above the predetermined threshold and from the long image in other zones.

12. The image processing device according to claim 11, wherein the gray level alignment comprises estimating an offset and ratio between the long image and the short image to align the sequence of two or more images.

13. The image processing device according to claim 12, further comprising using the estimated offset and ratio to correct the short image to have proper gray level alignment with the long image.

14. The image processing device according to claim 11, wherein the processor is further operable to:
  perform a geometrical registration process to align the short image and the long image; and
  when the geometrical registration process indicates excessive motion common to the sequence of two or more images, discard the long image and producing the final image from the filtered short image.

15. The image processing device according to claim 14, wherein, when the processor determines that the geometrical registration process indicates presence of global motion between the short image and the long image, the processor is further operable to discard the long image and produce the final image from the filtered short image.

16. The image processing device according to claim 14, further comprising a detector that detects motion of the image processing device relative to a subject of an image of the sequence of two or more images to detect the excessive motion common to the sequence of two or more images.

17. The image processing device according to claim 14, wherein the processor is operable to perform the geometrical registration process comprising estimating a cross-correlation between the short image and the long image in a vertical direction and a horizontal direction.

18. The image processing device according to claim 17, wherein the cross-correlation comprises, in the processor, cross-correlating along a plurality of lines among the short image and the long image.

19. The image processing device according to claim 11, wherein the image processing device comprises a camera.

20. The image processing device according to claim 11, further comprising a gyro configured to assess motion of the image processing device.

* * * * *